United States Patent [19]

Gallagher et al.

[11] Patent Number: 5,674,931

[45] Date of Patent: Oct. 7, 1997

[54] FLAME RETARDANT HEAVILY FILLED THERMOPLASTIC COMPOSITION

[75] Inventors: Eileen Barbara Walsh Gallagher, Glenmont, N.Y.; Angelika Howard Clark, Mt. Vernon, Ind.; Ronald Dale Courson, Crossville, Ill.

[73] Assignee: General Electric Company, Pittsfield, Mass.

[21] Appl. No.: 418,726

[22] Filed: Apr. 7, 1995

[51] Int. Cl.⁶ .................................................. C08K 3/32
[52] U.S. Cl. ......................................................... 524/414
[58] Field of Search .............................. 528/176, 196; 524/115, 1, 80, 414

[56] References Cited

U.S. PATENT DOCUMENTS

| | | | |
|---|---|---|---|
| Re. 31,992 | 9/1985 | Ancker et al. | 523/202 |
| 2,465,319 | 3/1949 | Whinfield et al. | 528/176 |
| 2,901,466 | 8/1959 | Kibler et al. | 528/176 |
| 3,023,192 | 2/1962 | Shivers et al. | 528/176 |
| 3,047,539 | 7/1962 | Pengilly | 528/176 |
| 3,462,389 | 8/1969 | Schulde et al. | 528/176 |
| 3,651,014 | 3/1972 | Witsiepe | 528/176 |
| 3,763,109 | 10/1973 | Witsiepe | 528/176 |
| 3,764,576 | 10/1973 | Russo | 524/86 |
| 3,766,146 | 10/1973 | Witsiepe | 528/176 |
| 3,784,520 | 1/1974 | Hoeschele | 528/176 |
| 3,801,547 | 4/1974 | Hoeschele | 528/176 |
| 3,935,081 | 1/1976 | Shotton | 204/30 |
| 3,953,394 | 4/1976 | Fox et al. | 528/176 |
| 3,971,753 | 7/1976 | Anderson | 528/176 |
| 3,971,763 | 7/1976 | Frechtling et al. | 528/176 |
| 3,986,997 | 10/1976 | Clark | 427/162 |
| 4,043,971 | 8/1977 | Wurmb et al. | 528/176 |
| 4,156,774 | 5/1979 | Buxbaum et al. | 528/273 |
| 4,197,335 | 4/1980 | Goossens | 427/162 |
| 4,264,761 | 4/1981 | McGirk | 528/300 |
| 4,278,804 | 7/1981 | Ashby et al. | 556/436 |
| 4,284,550 | 8/1981 | Mizuno et al. | 528/176 |
| 4,293,479 | 10/1981 | Hanada et al. | 528/176 |
| 4,348,462 | 9/1982 | Chung | 428/412 |
| 4,351,758 | 9/1982 | Lu et al. | 524/227 |
| 4,353,817 | 10/1982 | Nakae et al. | 524/232 |
| 4,355,155 | 10/1982 | Nelson | 528/301 |
| 4,357,271 | 11/1982 | Rosenquist | 523/212 |
| 4,369,280 | 1/1983 | Dieck et al. | 524/281 |
| 4,379,190 | 4/1983 | Schenck | 428/95 |
| 4,444,931 | 4/1984 | Lu et al. | 524/227 |
| 4,483,958 | 11/1984 | Kosaka et al. | 524/409 |
| 4,491,508 | 1/1985 | Olson et al. | 204/159.13 |
| 4,510,196 | 4/1985 | Carter, Jr. | 428/220 |
| 4,532,290 | 7/1985 | Jaquiss et al. | 524/417 |
| 4,548,979 | 10/1985 | Weise et al. | 524/403 |
| 4,556,688 | 12/1985 | McCready et al. | 525/33 |
| 4,556,705 | 12/1985 | McCready | 528/289 |
| 4,598,117 | 7/1986 | Liu et al. | 524/444 |
| 4,624,870 | 11/1986 | Anthony | 427/387 |
| 4,626,566 | 12/1986 | Miller et al. | 524/490 |
| 4,639,486 | 1/1987 | Liu | 524/409 |
| 4,661,555 | 4/1987 | Koga et al. | 524/611 |
| 4,664,983 | 5/1987 | Nakamura et al. | 428/458 |
| 4,672,086 | 6/1987 | Seiler et al. | 524/127 |
| 4,687,692 | 8/1987 | Hepp | 428/137 |
| 4,687,802 | 8/1987 | Hepp | 524/411 |
| 4,714,657 | 12/1987 | Quinn et al. | 428/412 |
| 4,722,959 | 2/1988 | Inoue et al. | 524/412 |
| 4,732,928 | 3/1988 | Mizushiro et al. | 524/505 |
| 4,732,939 | 3/1988 | Hoshi et al. | 525/106 |
| 4,734,450 | 3/1988 | Kawai et al. | 524/413 |
| 4,760,112 | 7/1988 | McCready et al. | 525/33 |
| 4,780,402 | 10/1988 | Remmington | 430/533 |
| 4,780,527 | 10/1988 | Tong et al. | 528/279 |
| 4,790,965 | 12/1988 | Thorsrud | 264/25 |
| 4,891,397 | 1/1990 | Liu | 524/141 |
| 4,891,399 | 1/1990 | Ohkawa et al. | 523/200 |
| 4,916,170 | 4/1990 | Nambu et al. | 523/137 |
| 4,988,740 | 1/1991 | Walter | 521/138 |
| 5,026,758 | 6/1991 | Grigo et al. | 524/423 |
| 5,132,353 | 7/1992 | Wallace | 524/432 |
| 5,367,011 | 11/1994 | Walsh | 524/417 |

FOREIGN PATENT DOCUMENTS

| | | |
|---|---|---|
| 0019926 | 12/1980 | European Pat. Off. . |
| 0 264 143 | 4/1988 | European Pat. Off. . |
| 230 252 A3 | 11/1985 | Germany . |
| 51-47739 | 12/1976 | Japan . |
| 52-80345 | 7/1977 | Japan . |
| 53-101038 | 9/1978 | Japan . |
| 53-102381 | 9/1978 | Japan . |
| 56-67363 | 6/1981 | Japan . |
| 60-23163 | 2/1985 | Japan . |
| 60-231763 | 11/1985 | Japan . |
| 63-119084 | 5/1988 | Japan . |
| 1-178540 | 7/1989 | Japan . |
| 2-284942 | 11/1990 | Japan . |

*Primary Examiner*—Terressa Mosley

[57] ABSTRACT

A highly filled flame retardant thermoplastic composition of at least one thermoplastic resin, at least about 20 percent by weight of an inorganic filler, and effective flame retarding amount of a metal acid pyrophosphate, and optionally, an impact modifier, an anti-drip agent and/or a second flame retardant.

30 Claims, No Drawings

FLAME RETARDANT HEAVILY FILLED THERMOPLASTIC COMPOSITION

The present invention is concerned with stable blends which comprise thermoplastic resins and particularly heavily-mineral-filled thermoplastic resins and extruded sheet which was rendered flame retardant with a metal acid pyrophosphate compound.

BACKGROUND OF THE INVENTION

Thermoplastic molding compositions are based on a thermoplastic resin and are widely used for the injection molding or extrusion of many products. In many applications it was necessary to add materials to the composition which will impart flame retardance to the molded article. In the prior art many additives have been used for this purpose. For example, U.S. Pat. No. 3,915,926 discloses a composition of a polycarbonate and a brominated flame retardant in combination with an antimony compound. Generally, it has been found that when a brominated compound has been used as the sole flame retardant additive, the composition has not been rendered sufficiently flame retardant so that it passes the Underwriters Laboratory No. 94 test and receives a V0 rating. The antimony compound was added to the composition to act as synergist for the brominated flame retardant to obtain a V0 rating.

Organic phosphates have also been added to thermoplastic compositions to impart flame retardant properties. It was theorized that the organic phosphates act as flame retardants because they volatilize when exposed to the intense heat that was generated by contact with an open flame and form a protective barrier close to the surface of the thermoplastic material in which they are dispersed.

Copending application Ser. No. 07/994,794, filed Dec. 22, 1992, by Richard C. Crosby and Douglas G. Hamilton discloses that polyacid pyrophosphates are used to stabilize polyester-polycarbonate compositions.

Copending application Ser. No. 07/994,738, filed by Eileen Walsh discloses that polyacid pyrophosphates are used to stabilize polyester compositions.

In the case of thermoplastic resins and extruded sheet which contain large amounts of mineral fillers, there are some limitations in applications requiring improved flame retardancy. For example, countertop backsplashes and vertical wall applications such as wainscoting are applications which are more stringent with regard to burn rates and flame spread.

Highly filled thermoplastic blends can be more difficult to flame retard compared to the corresponding unfilled blends. This decrease in flame retardant properties for highly filled plastic materials may be due to changes in the burn mechanism associated with the burning material. In addition changes in heat transfer or heat absorption, due to the filler, or changes in physical properties, such as porosity or specific gravity, can affect flame spread. Smoke generation can also be affected as the temperature at which the material burns as well as the degree of char formation changes. An increase in the amount of dripping associated with the material may also be seen when non-reinforcing fillers are used.

It has been surprisingly discovered that filled thermoplastic compositions may be rendered flame retardant, obtaining a V0 flame rating under Underwriters Laboratories Test No. 94, by the addition of effective amounts of a metal acid pyrophosphate and, optionally, a halogenated flame retardant. This was unexpected because metal acid pyrophosphate compounds are inorganic and are not considered volatile. It has also been found that this flame retardance was obtainable without the use of an organic phosphate compound or an antimony oxide synergist.

SUMMARY OF THE INVENTION

The invention provides compositions comprising:
(a) 20–90 weight percent of a thermoplastic resin
(b) from about 20 to about 80 weight percent of an inorganic filler such as barium sulfate, strontium sulfate, zirconium oxide and/or zinc sulfate; and
(c) an effective flame retarding amount of a metal pyrophosphate of the formula:

wherein M is a metal, x is a number from 1 to 12, y is a number from 1 to 12, n is a number from 2 to 10, z is a number from 1 to 5, and the sum of (xz)+y is equal to n+2; wherein all weight percentages are based upon the weight of the total composition. The thermoplastic resin may be a polyester such as poly(butylene terephthalate), poly(cyclohexylene terephthalate, poly(ethylene terephthalate), individually, or a mixture of such polyesters with other nonpolyester thermoplastic resins such as polycarbonate.

The compositions may also contain impact modifiers, other flame retardants, such as, for example, halogenated flame retardants, anti-drip additives, organic phosphates, and stabilizers.

The invention also includes articles molded from such compositions and methods of rendering thermoplastic resins flame retardant.

DETAILED DESCRIPTION OF THE INVENTION

The thermoplastic resins according to the invention include single thermoplastic resins or a heteropolymer thermoplastic resin blend. Suitable thermoplastic resins include, for example, polyesters, polyethers, polyamides, polyolefins, polycarbonates, including mixtures of these polymers provided that such mixture constitutes a heteropolymer blend. By the term "heteropolymer thermoplastic resin blend" it is meant a blend of two polymers from differing classes of polymers, such as blends of the foregoing but excluding blends of two polymers from within the same class of polymers, e.g., polyester/polyester blends, etc. A heteropolymer thermoplastic resin blend does not, however, exclude blends of two polyesters which are part of a blend of polymers from different classes, e.g., a blend of polycarbonate, polybutylene terephthalate and polyethylene terephthalate. As polyester resins constitute the most preferred single thermoplastic resins, the invention will be described using polyesters as the example.

Polyesters suitable for preparing the present compositions include those comprising structural units of the formula (I):

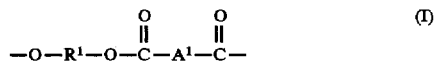

wherein each $R^1$ is independently a divalent aliphatic hydrocarbon, alicyclic hydrocarbon, aromatic hydrocarbon, polyoxyalkylene radical, or mixtures thereof and each $A^1$ is independently a divalent aliphatic, alicyclic or aromatic radical, or mixtures thereof. Examples of suitable polyesters containing the structure of formula (I) are poly(alkylene dicarboxylates), elastomeric polyesters, liquid crystalline polyesters, polyarylates, and polyester copolymers such as copolyestercarbonates. It is also possible to use a branched polyester in which a branching agent, for example, a glycol having three or more hydroxyl groups or a trifunctional or multifunctional carboxylic acid has been incorporated. Treatment of the polyester with a trifunctional or multifunctional epoxy compound, for example, triglycidyl isocyanurate can also be used to make a branched polyester. Furthermore, it is sometimes desirable to have various concentrations of acid and hydroxyl endgroups on the polyester, depending on the ultimate end-use of the composition.

In some instances, it is desirable to reduce the number of acid endgroups, typically to less than about 30 micro equivalents per gram, with the use of acid reactive species. In other instances, it is desirable that the polyester has a relatively high carboxylic end group concentration, e.g., about 5–250 micro equivalents per gram or, more preferable, about 20–70 micro equivalents per gram The $R^1$ radical may be, for example, a $C_{2-10}$ alkylene radical, a $C_{6-10}$ alicyclic radical, a $C_{6-10}$ aromatic radical or a polyoxyalkylene radical in which the alkylene groups contain about 2–6 and most often 2 or 4 carbon atoms. The $A^1$ radical in the above formula (I) is most often p-or m-phenylene or a mixture thereof. As previously noted, this class of polyester includes the poly(alkylene terephthalates) and the polyarylates. Such polyesters are known in the art as illustrated by the following U.S. Patents, which are incorporated herein by reference: used without predrying and the volatile materials are removed through the use of vacuum venting the extruder.

The polyesters generally have number average molecular weights in the range of about 20,000–70,000, as determined by intrinsic viscosity (I.V.) at 30° C. in a 60:40 by weight mixture of phenol and 1,1,2,2-tetrachloroethane.

It is further preferred to employ an inorganic filler to the polyester resin to impart a series of additional beneficial properties, not the least of which are thermal stability, increased density, and texture. Inorganic fillers in general are well known in the art.

Typical inorganic fillers which are employed in thermoplastic resins in general, and polyesters in specific, include: zinc oxide, barium sulfate, zirconium oxide, zirconium silicate, strontium sulfate, alumina, amorphous silica, anhydrous aluminum silicate, barium ferrite, calcium carbonate, mica, feldspar, clay, talc, magnesium oxide, magnesium silicate, nepheline syenite, phenolic resins, glass microspheres, wollastonite, titanium dioxide, ground quartz as well as mixtures of the above. In several applications such as when a ceramic-type look and feel are desired, it is important that the filler be limited to the more preferred fillers including zinc oxide, barium sulfate, zirconium oxide, zirconium silicate, strontium sulfate, titanium dioxide, and mixtures of the above.

The molding compositions may include a resin as specified above with from 20–80% by weight, preferably 30–75% by weight or most preferably 30–45% by weight of total composition of filler component. For certain applications where a ceramic like product is desired, more than 30%, or more preferably 40–70% by weight of the total composition of filler component should be employed.

However, as mentioned in the background of the invention, these heavily-filled thermoplastic resins have provided unique problems when attempting to achieve suitable flame retardant properties. Quite unexpectedly, the present inventors discovered that heavily-filled resin compositions can actually be rendered flame retardant with a metal acid pyrophosphate.

The metal acid pyrophosphates of the present invention are of the formula:

wherein M is a metal, x is a number from 1 to 12, y is a number from 1 to 12, n is a number from 2 to 10, z is a number from 1 to 5 and the sum of (xz)+y is equal to n+2.

These compounds include, for example, $Na_3HP_2O_7$, $K_2H_2P_2O_7$; $Na_4P_2O_7$; $KNaH_2P_2O_7$ and $Na_2H_2P_2O_7$. The particle size of the metal acid pyrophosphate should be less than 75 microns, preferably less than 50 microns and most preferably less than 20 microns. It is preferred to use an effective flame retarding amount of the pyrophosphate material. Typically, the most effective flame retarding amounts range from about 1 to 25 wt. % and preferably from about 7 to 15 wt. %, and most preferably from about 3 to 5%, optionally in combination with a halogenated flame retardant such as bromine, as described below.

The present invention also contemplates the addition of a second flame retardant to be used in combination with the metal acid pyrophosphate above. Although most conventional non-halogenated flame retardants such as monomeric, oligomeric and polymeric phosphate, antimony oxide, etc. may be used, it is preferred that the second flame retardant be halogen based.

The halogenated flame retardants include those halogenated compounds that are compatible with thermoplastic resins. Examples of these compounds include those of the formula (IV):

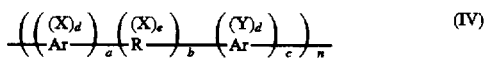

wherein n is 1 to 10 and R is an alkylene, alkylidene or cycloaliphatic linkage, e.g., methylene, ethylene, propylene, isopropylene, isopropylidene, butylene, isobutylene, amylene cyclohexylene, cyclopentylidene, and the like; a linkage selected from the group consisting of ether, carbonyl; amine; a sulfur containing linkage, e.g., sulfide, sulfoxide, sulfone, carbonate; a phosphorus containing linkage; and the like. R can also consist of two or more arylene or alkylidene linkages connected by such groups as aromatic, amino, ether, ester, carbonyl, sulfide, sulfoxide, sulfone, a phosphorus-containing linkage, and the like. R can be a dihydric phenol, e.g., bisphenol-A, carbonate linkage. Other groups which are represented by R will occur to those skilled in the art. Compounds of this type are disclosed in U.S. Pat. Nos. 3,647,747 and 3,334,154 both of which are incorporated by reference.

Ar and Ar' are mono- or polycarbocyclic aromatic groups such as phenylene, biphenylene, terphenylene, naphthylene, and the like. Ar and Ar' may be the same or different.

Y is a substituent selected from the group consisting of organic, inorganic or organometallic radicals. The substituents represented by Y include (1) halogen, e.g., chlorine, bromine, iodine, or fluorine or (2) ether groups of the general formula OE, wherein E is a monovalent hydrocarbon radical similar to X or (3) monovalent hydrocarbon groups of the type represented by R or (4) other substituents, e.g., nitro, cyano, etc., said substituents being essentially inert provided there be at least one and preferably two halogen atoms per aryl, e.g. phenyl.

X is a monovalent hydrocarbon group exemplified by the following: alkyl, such as methyl, ethyl, propyl, isopropyl, butyl, decyl, and the like; aryl groups, such as phenyl, naphthyl, biphenyl, xylyl, tolyl, and the like; aralkyl groups, such as benzyl, ethylphenyl, and the like; cycloaliphatic groups, such as cyclopentyl, cyclohexyl, and the like; as well as monovalent hydrocarbon groups containing inert substituents therein. It will be understood that where more than one X is used they may be alike or different.

The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c may be 0. Otherwise, either a or c, but not both, may be 0. Where b is 0, the aromatic groups are joined by a direct carbon-carbon bond.

The hydroxyl and Y substituents on the aromatic groups, Ar and Ar' can be varied in the ortho, meta or para positions on the aromatic rings and the groups can be in any possible geometric relationship with respect to one another.

The preparation of these and other applicable biphenyls are known in the art. In place of the divalent aliphatic group in the above examples may be substituted sulfide, sulfoxy, and the like.

Included within the above structural formula are substituted benzenes exemplified by tetrabromobenzene, hexachlorobenzene, hexabrombenzene, and biphenyls such as 2,2'-dichlorobiphenyl, 2,4'dibrdibromobiphenyl, 2,4'-dichlorobiphenyl, hexabromobiphenyl, octabromobiphenyl, decabromobiphenyl and halogenated diphenyl ethers containing 2 to 10 halogen atoms.

The preferred halogen compounds for this invention are aromatic halogen compounds such as chlorinated benzene, brominated benzene, chlorinated biphenyl, chlorinated terphenyl, brominated biphenyl, brominated terphenyl or a compound comprising two phenyl radicals separated by a divalent alkylene group and having at least two chlorine or bromine atoms per phenyl nucleus, and mixtures of at least two of the foregoing.

Also preferred according to the present invention are brominated polycarbonates having the formula (V):

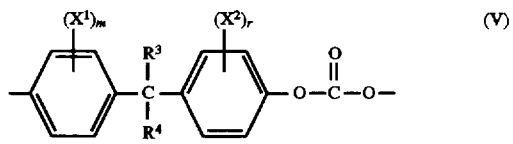

where $R^3$ and $R^4$ are hydrogen (lower alkyl) or phenyl, $X^1$ and $X^2$ are bromo and m and r are from 1 to 4, the average number of repeating units being from about 2 to 20, the second component of the combination being an aromatic homopolymer comprising units of this formula:

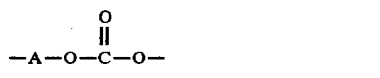

wherein A is a divalent aromatic radical of the dihydric phenol. Preferably, they will comprise repeating units of the formula (VI):

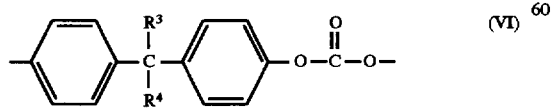

$R^3$ and $R^4$ are the same as hereinabove identified, the average number of repeating units being at least 100, and preferably from about 100 to about 400.

With respect to such homopolymer components having from about 2 to 20 repeating units, the preferred compounds will be further characterized in having low volatility when heated above 200° C.

If desired, an organic flame retardant phosphate may be substituted for the halogenated flame retardants of the composition at a level of from an effective amount up to about 25 weight percent or more, preferably at a level of from 5–15 weight percent. The organic phosphates are well known and are described in U.S. Pat. No. 4,033,927 which is incorporated by reference. In general, the preferred organic phosphate compounds are of the general formula (XII):

and nitrogen analogs thereof where each Q represents the same or different radicals including hydrocarbon radicals such as alkyl, cycloalkyl, aryl, alkyl substituted aryl and aryl substituted alkyl; halogen; hydrogen and combinations thereof provided that at least one of said Qs is aryl. Typical examples of suitable phosphates include phenylbisdodecyl phosphate, phenylbisneopentyl phosphate, phenylethylene hydrogen phosphate, pheyl-bis-(3,5,5'-trimethylhexyl phosphate), ethylydiphenyl phosphate, bis(2-ethylhexyl)-p-tolylphosphate, tritolyl phosphate, bis(2-ethylhexyl)-phenyl phosphate, tri(nonylphenyl)phosphate, phenylmethyl hydrogen phosphate, di(dodecyl)-p-tolyl phosphate, tricresyl phosphate, triphenyl phosphate, halogenated triphenyl phosphate, dibutylphenyl phosphate, 2-chloreoethyldiphenyl phosphate, p-tolyl bis (2,5,5'-trimethylhexyl) phosphate, 2-ethylhexyldiphenyl phosphate, diphenyl hydrogen phosphate, resorcinol diphosphate and the like.

As indicated earlier, the present invention has applicability in a broad range of polymers and blends thereof. Among the preferred blends are polyester blends such as polyalkylene terephthalates and polycarbonates, polycarbonate blends such as polycarbonate and ABS, nylon blends, such as polyphenylene ether and nylon, etc. Clearly, other blends of these resins are also contemplated.

The polycarbonates of the instant invention contain at least one recurring structural unit represented by the formula: (XII)

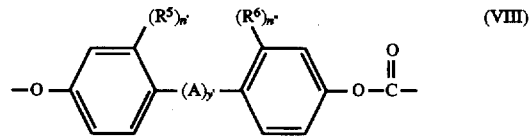

wherein:

$R^5$ is independently selected from halogen, monovalent hydrocarbon, and monovalent hydrocarbonoxy radicals;

$R^6$ is independently selected from halogen, monovalent hydrocarbon, and monovalent hydrocarbonoxy radicals;

A is selected from divalent hydrocarbon radicals,

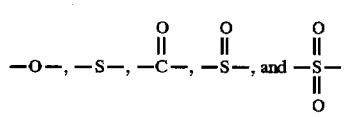

n' and n" are independently selected from integers having a value of from 0 to 4 inclusive; and y' is either zero or one.

The monovalent hydrocarbon radicals represented by $R^5$ and $R^6$ include the alkyl, cycloalkyl, aryl, aralkyl, and alkaryl radicals.

The preferred halogen radicals represented by $R^5$ and $R^6$ are chlorine and bromine.

The monovalent hydrocarbonoxy radicals may be represented by the general formula $—OR^7$ wherein $R^7$ has the same meaning as $R^5$ and $R^6$. The preferred hydrocarbonoxy radicals are the alkoxy and the aryloxy radicals.

The divalent hydrocarbon radicals represented by A include the alkylene, alkylidene, cycloalkylene, and cycloalkylidene radicals. The preferred alkylene radicals are those containing from 2 to about 30 carbon atoms. The preferred cycloalkylene and cycloalkylidene radicals are those containing from 6 to about 16 ring carbon atoms. Monofunctional phenols can be added as end capping agents to the polymerization to control molecular weight and provide desired properties.

It may be desirable to add an impact modifier to increase the toughness of the composition. Although the invention contemplates most impact modifiers, the particular impact modifier or combination thereof will depend upon the thermoplastic resin or blend which is selected. As the present invention prefers the selection of polyesters and blends thereof with other thermoplastic resins, the preferred impact modifier would be based on a high molecular weight styrene-diene rubber or an acrylate rubber at a level of from 1 to 30 weight percent or more preferably from 5 to 15 weight percent. A preferred class of rubber materials are copolymers, including random, block and graft copolymers of vinyl aromatic compounds and conjugated dienes. Exemplary of these materials there may be given hydrogenated, partially hydrogenated, or non-hydrogenated block copolymers of the A-B-A and A-B type wherein A is polystyrene and B is an elastomeric diene, e.g. polybutadiene, polyisoprene, radial teleblock copolymer of styrene and a Y conjugated diene, acrylic resin modified styrene-butadiene resins and the like; and graft copolymers obtained by graft-copolymerization of a monomer or monomer mix containing a styrene compound as the main component to a rubber-like polymer. The rubber-like polymer used in the graft copolymer is as already described herein including polybutadiene, styrene-butadiene copolymer, acrylonitrile-butadiene copolymer, ethylene-propylene copolymer, ethylene-butylene copolymer, polyacrylate and the like. The styrene compound includes styrene, methylstyrene, dimethylstyrene, isopropylstyrene, alphamethylstyrene, ethylvinyltoluene and the like. Procedures for the preparation of these polymers are found in U.S. Pat. Nos. 4,196,116; 3,299,174 and 3,333,024, and of which are incorporated by reference.

If desired, reinforcing fillers such as glass fibers or carbon fibers or non-reinforcing fillers such as talc, clay, mica, glass spheres, wollastonite, and the like may be added in addition to the above-described mineral fillers. In addition, stabilizers, lubricants, flow aids, colorants, etc. may also be added.

The stabilizers are used at a level of 0.01–10 weight percent and preferably at a level of from 0.05–2 weight percent. The stabilizers include an effective amount of an acidic phosphate salt; an acid, alkyl, aryl or mixed phosphite having at least one hydrogen or alkyl group; a Group IB or Group IIB metal phosphate salt; a phosphorous oxo acid or a mixture thereof. The suitability of a particular compound for use as a stabilizer and the determination of how much is to be used as a stabilizer may be readily determined by preparing a mixture of the polyester component, the polycarbonate and the filler with and without the particular compound and determining the effect on melt viscosity or color stability or the formation of interpolymers.

The acidic phosphate salt stabilizers include sodium dihydrogen phosphate, monozinc phosphate, potassium dihydrogen phosphate, calcium hydrogen phosphate and the like. The phosphites may be of the formula:

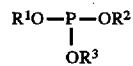

where $R^1$, $R^2$ and $R^3$ are independently selected from the group consisting of hydrogen, alkyl and aryl with the proviso that at least one of $R^1$, $R^2$ and $R^3$ is hydrogen or alkyl.

The phosphate salts of a Group IB or Group IIB metal include zinc phosphate, copper phosphate and the like. The phosphorous oxo acids include phosphorous acid, phosphoric acid, polyphosphoric acid or hypophosphorous acid.

Polytetrafluoroethylene may also be added to enhance flame retardance as a drip inhibitor. These polymers are described in U.S. Pat. No. 3,005,795 which is incorporated by reference. Generally from 0.01–10 weight percent and more preferably from 0.01–5 weight percent of the polytetrafluoroethylene may be utilized.

Antioxidants such as octadecyl (3,5-di-ter-butyl-4-hydroxyhydro cinnamate) methane may be used at a level of from 0.05 to 1 wt. %.

As used herein and in the appended claims, the term "weight percent" means the percent by weight of each component based on the total weight of composition.

The invention also includes the novel articles made from the compositions of the invention.

Articles may be formed from the compositions of the invention by extrusion which may be carried out by extrusion of pelletized resin followed by molding. Preferred extrusion conditions are 480° F. die temperature, 420°–520° F. barrel temperature, 150° to 280° F. roll temperatures.

EXAMPLES

The following examples are presented in order to illustrate the present invention. They are not to be construed to limit the scope of the appended claims but rather to exemplify its broad applicability.

Example 1 And Comparative Example A

The following compositions were prepared by tumble blending the ingredients, extruding in a 2.5 inch vented single screw extruder with a melt temperature of 500° to 530° F. They were dried and molded on an 80 ton Van Dorn injection molding machine at a temperature of 500° C. and a mold temperature of 150° C.

|  | Example 1 | Comparative Example A |
|---|---|---|
| PBT[a] | 36.15 | 36.15 |
| Brominated polycarbonate[b] | 32.2 | 32.2 |
| Glass fiber | 20.0 | 30.0 |
| PTFE concentrate[c] | 2.0 | 2.0 |
| $Na_2H_2P_2O_7$ | 10 | 0.2 |
| Antioxidant[d] | 0.15 | 0.15 |
| Mold release[e] | 0.2 | 0.2 |

[a]Valox 295, polybutylene terephthalate, GE Co., 1200–1800 poise (ASTM method D-1238; Tinius Olsen melt indexer at 250° C., 0.0825 inch orifice).

|  | Example 1 | Comparative Example A |
|---|---|---| b A 50:50 copolymer of bisphenol-A and tetrabromobisphenol-A having an IV of 0.34 dl/g. as measured in methylene chloride at 25° C.
c A composition of polytetrafluoroethylene and a polycarbonate of bishphenol-A prepared according to Example 1 of U.S. Pat. No. 5,102,696 which is incorporated by reference.
d Octadecyl(3,5-di-tert-butyl-4-hydroxyhydrocinnamate)methane.
e 10% polyethylene, 60% paraffin waxes and 30% high molecular weight olefins.

Test Results:

Test pieces 1/32" thick were tested according to Underwriters Laboratories Test No. 94 and the following results were obtained:

|  | Example 1 | Comparative Example A |
|---|---|---|
| Unaged | V0 | VII |
| Average FOT* | 1.45 | 4.86 |
| Aged** | V0 | VI |
| Average FOT* | 1.07 | 6.41 |

*FOT is flame out time.
**Sample was aged 7 days at 70° C. according to Underwriters Laboratories Test Procedure No. 94.

Example 2 and Comparative Example B

The following example illustrates the novel compositions of the invention. The blend was prepared by tumble blending the ingredients, extruding in a 2.5 inch vented single screw extruder with a melt temperature of 500° to 530° F. They were dried and molded on an 80 ton Van Dorn injection molding machine at a temperature of 500° C. and a mold temperature of 150° C.

|  | Example 2 | Comparative Example B |
|---|---|---|
| PBT$^a$ | 32.65 | 32.65 |
| Brominated polycarbonate$^b$ | 30.00 | 30.00 |
| Glass fiber | 25.00 | 25.00 |
| Sodium acid pyrophosphate | 10.00 | — |
| Polytetrafluoroethylene$^c$ | 2.00 | 2.00 |
| Antioxidant$^d$ | 0.15 | 0.15 |
| Mold release$^e$ | 0.20 | 0.20 |

$^a$, $^b$, $^c$, $^d$ and $^e$ are described in Example 1

Test pieces 1/32" thick were tested according to Underwriters Laboratories Test No. 94 and the following results were obtained:

|  | Example 2 | Comparative Example B |
|---|---|---|
| Unaged | V0 | VII |
| Aged | V0 | VI |

Example 3

The following composition was prepared using the same general procedure that was employed for the preparation of Example 1:

| PBT$^a$ | 32.45 |
|---|---|
| PET$^f$ | 3.00 |
| Brominated polycarbonate$^b$ | 32.20 |
| Glass fiber | 20.00 |
| Sodium acid pyrophosphate | 10.00 |
| Antioxidant$^d$ | 0.15 |
| Mold release$^e$ | 0.20 |

$^a$, $^b$, $^d$ and $^e$ are described in Example 1; $^f$ is polyethylene terephthalate having an IV of 0.57 dl/g in 60:40 phenol-tetrachloroethane at 25° C.

Test pieces 1/32" thick were tested according to Underwriters Laboratories Test No. 94 and the following results were obtained:

|  | Example 3 |
|---|---|
| Unaged | V0 |
| Aged | V0 |

Example 4

The following composition was prepared using the same procedure that was set forth in Example 1:

| PET$^f$ | 35.65 |
|---|---|
| Brominated polycarbonate$^b$ | 32.0 |
| Glass fiber | 20.0 |
| PTFE concentrate$^c$ | 2.0 |
| Sodium acid pyrophosphate | 10.0 |
| Antioxidant$^d$ | 0.15 |
| Mold release$^e$ | 0.2 |

$^b$, $^c$, $^d$ and $^e$ are the same as described in Example 1; $^f$ is described in Example 3.

Test Results:

Test pieces 1/32" thick were tested according to Underwriters Laboratories Test No. 94 and the following results were obtained:

|  | Example 4 |
|---|---|
| Aged Sample | V0 |
| Unaged Sample | V0 |

Example 5

The following composition was prepared using the same procedure that was set forth in Example 1:

|  | Example 5 |
|---|---|
| PET$^f$ | 35.65 |
| Brominated polycarbonate | 32.00 |
| Glass fiber | 15.00 |
| Sodium acid pyrophosphate | 15.00 |
| Polytetrafluoroethylene$^c$ | 2.00 |
| Antioxidant$^d$ | 0.15 |
| Mold release | 0.20 |

Test Results:

Test pieces 1/32" thick were tested according to Underwriters Laboratories Test No. 94 and the following results were obtained:

|  | Example 5 |
| --- | --- |
| Unaged Sample | V0 |
| Aged Sample | V0 |

Example 6 and Comparative Example C

Using the same procedures of Example 1, the following compositions were prepared:

|  | Example 6 | Comparative Example C |
| --- | --- | --- |
| PBT[a] | 33.50 | 48.5 |
| Brominated polycarbonate[b] | 33.50 | 48.5 |
| PTFE concentrate[c] | 1.5 | 1.5 |
| Sodium acid pyrophosphate | 30.35 | 0.35 |
| Antioxidant[d] | 0.15 | 0.15 |
| Mold release[e] | 1.0 | 1.0 |

These compositions had the following physical properties:

|  | Example 6 | Comparative Example C |
| --- | --- | --- |
| Unaged 1/32" | V0 | VII |
| Aged 1/32" | V0 | VI |

(a)–(e) were the same as the materials of Example 1. Obviously, other modifications and variations of the present invention are possible in the light of the above teachings. For example, the present invention has unique applicability to thermoplastic resins or blends which contain large amounts of fillers.

Example 7

The following samples were run to test the viability, of metal acid pyrophosphates in thermoplastic resins or blends which were heavily filled with inorganic fillers. Test samples were tumble blended and extruded on a 2.5 inch single screw extruder with a melt temperature between 480° to 520° F. The materials were dried and molded into test plaques using an 80 ton Van Dorn injection molding machine at a temperature of 500°–510° F. and a mold temperature of 150° F. or extruded into flat sheet using a conventional sheet extruder and roll configuration with similar temperature profiles.

Cone Calorimetry, NBS, and OSU data were generated using certified testing equipment.

As can be seen from the results in Tables 1, 2 and 3 that follow, it was possible to effectively use metal acid pyrophosphates such as sodium acid pyrophosphate as a flame retardant in thermoplastic resin blends such as polycarbonate/polyester blends. The addition of the salt surprisingly reduces the flame spread of the material by reducing the rate of burn. This change in material flammability occurs with or without the addition of other conventional flame retardants such as antimony oxide or halogenated materials. This was particularly surprising for one reason because the metal phosphate was not a volatile material and most likely cannot have the same mode of flame retarding action as typical flame retardants such as organic phosphates and the like.

The NBS smoke test (National Bureau of Standards) was carried out using standard test method, ASTM E662. The test employs an enclosed cabinet (3 ft.×3 ft.×2 ft.) in which 3 in 2 test specimens are exposed to a flame source providing a heat flux of 2.5 watts/cm$^2$. Smoke production is measured using light absorption techniques and is expressed in terms of specific optical density. The test provides additional information on maximum smoke accumulation, smoke accumulation rate, time to reach maximum smoke density and time to reach a critical smoke density.

TABLE 1

| Composition | 7A | 7B | 7C | 7D | 7E | 7F | 7G | 7H | 7I | 7J |
| --- | --- | --- | --- | --- | --- | --- | --- | --- | --- | --- |
| PBT[g] | 17 | 17.3 | 20 | 32 | 32 | 32 | 29 | 29 | 29 | 26 |
| PET[h] | 9.8 | 9.8 | 9.5 | — | — | — | — | — | — | — |
| PC[i] | 27.8 | 17.7 | 19 | — | — | — | — | — | — | — |
| PC[j] | — | — | — | 30 | 30 | 30 | 28 | 28 | 28 | 26 |
| Kraton | 7.5 | 7.5 | 7.5 | — | — |  |  | 5 | 5 | 5 |
| BaSO4 | 37 | 37 | 28 | 37 | 32 | 32 | 32 | 37 | 32 | 32 |
| Br-PC | — | 10 | 9 | — | — | — | — | — | — | — |
| Stabilizers | 0.9 | 1 | 1 | 1 | 1 | 1 | 1 | 1 | 1 | 1 |
| SAPP | — | — | 6 | — | 5 | 5 | 10 | — | 5 | 10 |
| NBS Data |  |  |  |  |  |  |  |  |  |  |
| Ds max |  |  |  | 172 | 254 | >500 | 288 | >376 | 378 | 270 |
| Time max |  |  |  | 5.55 | 9.96 | 9.8 | 9.6 | 8.1 | 9.1 | 9.9 |
| OSU |  |  |  |  |  |  |  |  |  |  |
| PHR |  |  |  | 234 | 193 |  |  |  |  |  |
| Pk time |  |  |  | 1.27 | 1.48 |  |  |  |  |  |
| Cone Calorimetry |  |  |  |  |  |  |  |  |  |  |
| Ignition (sec) | 79 | 84 | 64 | 51 | 43 |  |  |  |  |  |
| Duration | 550 | 667 | 750 | 361 | 474 |  |  |  |  |  | g - VALOX ® 315, polybutylene terephthalate, GE Co. 7500–9500 poise;
h - PET ICI D26, polyethylene terephthalate, available from ICI Americas;
i - PC 151, polycarbonate, GE Co. melt flow 2–3 g/10 min. ASTM D1238;
j - PC 131, polycarbonte, GE Co., 3.04–4.12 g/10 min. ASTM D1238.
NOTE: Samples 7I and 7J used Kraton G1654, all other samples with Kraton used G1651.

Samples 7E and 7F are repetitive samples

NBS smoke numbers with>data, maximum smoke generated during test. SAPP stands for sodium acid pyrophosphate.

TABLE 2

| Composition | 7K | 7L | 7M | 7N | 7O | 7P | 7Q | 7R | 7S |
|---|---|---|---|---|---|---|---|---|---|
| PBT* | 100 | 95 | 90 | 70 | 66.5 | 63 | 65 | 65 | 65 |
| PC$^k$ | — | — | — | 30 | 28.5 | 27 | — | — | — |
| BaSO$_4$ | — | — | — | — | — | — | 30 | 25 | 30 |
| SAPP | — | 5 | 10 | — | 5 | 10 | 5 | 10 | — |
| NBS Data | | | | | | | | | |
| Ds max | 100 | 185 | 364 | 121 | 219 | 197 | 430 | 504 | 185 |
| Time max | 8.81 | 8.77 | 6.51 | 5.57 | 6.55 | 7.58 | 5.67 | 4.43 | 7.21 |

TABLE 3

| Compositions | 7T | 7U | 7V | 7W | 7X | 7Y |
|---|---|---|---|---|---|---|
| PBT* | — | — | 17 | 29 | 27.4 | 28.7 |
| PET | 31 | 28 | 9.8 | — | — | — |
| PC$^k$ | — | — | 27.8 | — | — | — |
| PC$^j$ | 22.3 | 20.3 | — | 15 | 20.3 | 21.7 |
| Kraton | — | 5 | 7.5 | 5 | 5 | 5 |
| BaSO$_4$ | 32 | 32 | 37 | 35 | 36 | 32 |
| Br-PC | 7 | 7 | — | 10 | 7 | 7 |
| Stabilizers | 0.7 | 0.7 | 0.9 | 1 | 0.8 | 0.6 |
| Teflon conc | 2 | 2 | — | — | — | — |
| SAPP | 5 | 5 | — | — | — | 5 |
| AOC 85/15[1] | — | — | — | — | 3.5 | — |
| Steiner Tunnel | | | | | | |
| Class | II | | III | III | | |
| Flame Spread | 25 | | 120 | 95 | | |
| Smoke density | 420 | | 360 | 380 | | |
| OSU | | | | | | |
| PHR | 113 | 127 | | 119 | 124 | 152 |
| PK time | 2.23 | 2.381 | | 1.83 | 1.74 | 1.64 | k - PC 1.21, polycarbonate 121, GE Co., 14.5–21.9 g/10 min ASTM D1238;
l - antimony oxide concentrate - 85% Sb$_2$O$_3$ + 15% ethylene vinyl acetate

We claim:

1. A flame retardant thermoplastic resin composition which comprises:
    (a) from 20–90 weight percent of at least one thermoplastic resin;
    (b) from about 20 to about 80 weight percent of an inorganic filler; and
    (c) an effective flame retarding amount of metal acid pyrophosphate of the formula:

$$M^z{}_xH_yP_nO_{3n+1}$$

wherein M is a metal selected from the group consisting of alkali metals and alkaline earth metals, x is a number from 1 to 12, y is a number from 1 to 12, n is a number from 2 to 10, z is a number from 1 to 5, and the sum of xz +y is equal to n+2, all percentages being based on the weight of the total composition,
    (d) a halogenated flame retardant wherein said composition is characterized by the absence of an antimony compound as a synergist for said halogenated flame retardant wherein said metal acid pyrophosphate and said halogenated flame retardant are present in an effective amount to render sufficient flame retardancy to said composition wherein said composition receives a VO rating under Underwriters Laboratory test No. 94.

2. The composition as defined in claim 1 wherein said thermoplastic resin comprises a polyester resin.

3. The composition as defined in claim 1, wherein the amount of said metal acid pyrophosphate ranges from about 5 weight percent to about 25 weight percent by weight of the total composition.

4. The composition as defined in claim 1, wherein the amount of said filler ranges from about about 20 percent to about 80 percent by weight.

5. The composition as defined in claim 1, which further comprises an effective impact modifying amount of a rubbery impact modifier.

6. The composition as defined in claim 2, which further comprises from an effective amount to about 70 percent by weight of the total composition of a polycarbonate resin.

7. The composition as defined in claim 1, which further comprises from an effective amount to about 10 percent by weight of the total composition of a polytetrafluoroethylene anti-drip additive.

8. A composition which comprises:
    (a) from about 20 to about 90 weight percent of a single thermoplastic resin or a heteropolymer thermoplastic resin blend;
    (b) from about 20 to about 80 weight percent of an inorganic filler selected from the group consisting of barium sulfate, strontium sulfate, zirconium oxide and zinc sulfate;
    (c) an effective flame retarding amount of a metal acid pyrophosphate of the formula:

$$M^z{}_xH_yP_nO_{3n+1}$$

wherein M is a metal selected from the group consisting of alkali metals and alkaline earth metals, x is a number from 1 to 12, y is a number from 1 to 12, n is a number from 2 to 10, z is a number from 1 to 5, and the sum of (xz)+y is equal to n+2;
    (d) from an effective amount to about 25 weight percent of a second flame retardant; said second flame retardant being a brominated flame retardant wherein said composition is characterized by the absence of an antimony compound as a synergist for said brominated flame retardant wherein said metal acid pyrophosphate and said halogenated flame retardant are present in an effective amount to render sufficient flame retardancy to said composition wherein said composition receives a VO rating under Underwriters Laboratory test No. 94;
    (e) an effective amount of a stabilizer selected from phosphites, acidic phosphate salts, phosphate salts of Group IB or Group IIB metal and phosphorous oxoacids; and
    (f) from about 1 to about 30 percent of an impact modifier, all percentages being based on the weight of the total composition.

9. The composition as defined in claim 2 wherein said polyester resin is polyethylene terephthalate.

10. The composition as defined in claim 2, wherein said polyester resin is polybutylene terephthalate.

11. The composition of claim 8, wherein said second flame retardant comprises a halogenated flame retardant.

12. The composition as defined in claim 11, wherein the amount of said filler ranges from about 30 to about 50 percent.

13. The composition as defined in claim 6, wherein said polycarbonate resin is blended with both polybutylene terephthalate and polyethylene terephthalate with the proviso that the sum of the polybutylene terephthalate and polyethylene terephthalate be at least 10 weight percent of the total composition.

14. A composition consisting essentially of:
  (a) from 20-65 weight percent of a single polyester resin or a blend of polyester resins:
  (b) from 25-65 weight percent of a brominated polycarbonate;
  (c) from 5-20 weight percent of a metal acid pyrophosphate;
  (d) from 1-45 weight percent of a rubbery impact modifier; and
  (e) from 0.1-5 weight percent of a stabilizer.

15. A method of imparting flame resistance to a thermoplastic resin composition, said method comprising adding to said resin composition an effective amount of a metal acid pyrophosphate of the formula:

$$M^z{}_x Hy\ P_n O_{3n+1}$$

wherein M is a metal selected form the group consisting of alkali metals and alkaline earth metals, x is a number form 1 to 12, y is a number from 1 to 12, n is a number form 2 to 10, z is a number from 1 to 5, and the sum of xz+y is equal to n+2, all percentages being based on the weight of the total composition and further, adding to said thermoplastic resin composition, a halogenated flame retardant wherein said further addition is characterized by the absence of an antimony compound as a synergist for said halogenated flame retardant and wherein said metal acid pyrophosphate and said halogenated flame retardant are present in an effective amount to render sufficient flame retardancy to said composition wherein said composition receives a VO rating under Underwriters Laboratory test No. 94.

16. The composition as defined in claim 1, wherein the metal acid pyrophosphate is selected from the group consisting of $K_2H_2P_2O_7$, $Na_4P_2O_7$, $KNaH_2P_2O_7$, $Na_3HP_2O_7$, and $Na_2H_2P_2O_7$.

17. The composition of claim 15, wherein said metal acid pyrophosphate is sodium acid pyrophosphate.

18. The composition of claim 1, wherein said composition has an National Bureau of Standards smoke test maximum time of at least 8.5.

19. The composition of claim 18, wherein said composition has an National Bureau of Standards smoke test maximum time of at least 9.0.

20. The composition as defined in claim 1 wherein said metal acid pyrophosphate is of the formula:

$$M^z{}_x Hy\ P_n O_{3n+1}$$

wherein M is a metal selected form the group consisting of alkali metals and alkaline earth metals, x is a number form 1 to 12, y is a number from 1 to 12, n is a number from 2 to 10, z is a number from 1 to 5, and the sum of (xy)+y is equal to n+2, all percentages being based on the weight of the total composition.

21. An article molded from the composition of claim 1.

22. The composition as defined in claim 3, wherein the amount of said metal acid phosphate rages from about 7 to about 15 weight percent of pyrophosphate.

23. The composition as defined in claim 3, wherein the amount of said metal acid phosphate ranges from about 3 to about 5 weight percent of pyrophosphate.

24. The composition of claim 1, wherein the amount of said filler ranges from about 30 to about 75 percent by weight of the total composition.

25. The composition of claim 1, wherein the amount of said filler ranges from about 30 to about 45 percent by weight of the total composition.

26. The composition of claim 1, wherein the particle size of the pyrophosphate is less than 75 microns.

27. The composition of claim 1, wherein the particle size of the pyrophosphate is less than 50 microns.

28. The composition of claim 1, wherein the particle size of the pyrophosphate is less than 20 microns.

29. The composition of claim 1, wherein said composition has a VO rating according to Underwriters Laboratories Test Number 94.

30. A flame retardant thermoplastic resin composition consisting essentially of:
  (a) from about 20 to about 90 weight percent of a thermoplastic resin;
  (b) from about 20 to about 80 weight percent of an inorganic filler; and
  (c) an effective flame retarding amount of a metal acid pyrophosphate
  (d) a halogenated flame retardant wherein said composition is characterized by the absence of an antimony compound as a synergist for said halogenated flame retardant wherein said metal acid pyrophosphate and said halogenated flame retardant are present in an effective amount to render sufficient flame retardancy to said composition wherein said composition receives a VO rating under Underwriters Laboratory test No. 94.

* * * * *